(12) United States Patent
Shentu et al.

(10) Patent No.: US 12,474,155 B2
(45) Date of Patent: Nov. 18, 2025

(54) UNDERGROUND THREE-DIMENSIONAL DISPLACEMENT MEASUREMENT SYSTEM AND METHOD BASED ON DOUBLE MUTUAL INDUCTANCE EQUIVALENT VOLTAGE

(71) Applicant: CHINA JILIANG UNIVERSITY, Zhejiang (CN)

(72) Inventors: Nanying Shentu, Zhejiang (CN); Qing Li, Zhejiang (CN); Ge Shi, Zhejiang (CN); Feng Wang, Zhejiang (CN); Sheng Wang, Zhejiang (CN)

(73) Assignee: CHINA JILIANG UNIVERSITY, Zhejiang (CN)

( * ) Notice: Subject to any disclaimer, the term of this patent is extended or adjusted under 35 U.S.C. 154(b) by 420 days.

(21) Appl. No.: 18/024,979

(22) PCT Filed: Oct. 18, 2021

(86) PCT No.: PCT/CN2021/124505
§ 371 (c)(1),
(2) Date: Mar. 7, 2023

(87) PCT Pub. No.: WO2022/053073
PCT Pub. Date: Mar. 17, 2022

(65) Prior Publication Data
US 2023/0288180 A1 Sep. 14, 2023

(30) Foreign Application Priority Data
Sep. 8, 2020 (CN) .......................... 202010934577.5

(51) Int. Cl.
*G01B 7/24* (2006.01)
*E21B 47/022* (2012.01)
(Continued)

(52) U.S. Cl.
CPC ............ *G01B 7/24* (2013.01); *E21B 47/0228* (2020.05); *G01C 9/06* (2013.01); *G01V 3/28* (2013.01);
(Continued)

(58) Field of Classification Search
CPC ...... G01V 3/28; G01C 9/06; G01C 2009/064; G01B 7/24; E21B 47/0228
See application file for complete search history.

(56) References Cited

U.S. PATENT DOCUMENTS 5,041,975 A * 8/1991 Minerbo .................. G01V 3/38
702/7
8,988,178 B2 * 3/2015 Deville .................. H01F 38/14
336/212
(Continued)

FOREIGN PATENT DOCUMENTS

CN  1098782    2/1995
CN  100397030 C  * 6/2008
(Continued)

OTHER PUBLICATIONS

Yang, Jie et al., "On real-time underground displacement monitor systems," Journal of China Jiliang University, vol. 19, No. 1, Mar. 2008, pp. 41-46.
(Continued)

*Primary Examiner* — Herbert K Roberts
(74) *Attorney, Agent, or Firm* — JCIPRNET

(57) ABSTRACT

Disclosed are an underground displacement three-dimensional measurement system and method based on a double mutual inductance voltage contour. The system comprises an on-site measuring device and a remote monitoring system. The on-site measuring device is mainly formed by serially connecting N sensing units and an underground displacement information lumping unit by means of a power
(Continued)

line and a communication line. The N sensing units are serially connected, and then are connected between an underground immovable layer and the ground. Each sensing unit comprises a PVC sleeve, a cylindrical air-core coil, a cylindrical magnetic core coil, and a PCB. Two adjacent sensing units form a measurement unit, and relative horizontal displacement and relative vertical displacement are measured by means of cooperation between the cylindrical air-core coil and the cylindrical magnetic core coil of a relative reference unit and the cylindrical air-core coil of the relative displacement unit.

9 Claims, 8 Drawing Sheets

(51) Int. Cl.
*E21B 47/0228* (2012.01)
*G01C 9/06* (2006.01)
*G01V 3/28* (2006.01)

(52) U.S. Cl.
CPC .... *G01B 2210/58* (2013.01); *G01C 2009/064* (2013.01)

(56) References Cited

U.S. PATENT DOCUMENTS

| | | | | |
|---|---|---|---|---|
| 2020/0017155 | A1* | 1/2020 | Hu | G05B 23/0283 |
| 2020/0257014 | A1* | 8/2020 | Khalaj Amineh | E21B 47/092 |

FOREIGN PATENT DOCUMENTS

| | | | | |
|---|---|---|---|---|
| CN | 101435689 | | 5/2009 | |
| CN | 101435689 A | * | 5/2009 | |
| CN | 101871764 | | 10/2010 | |
| CN | 101871764 A | * | 10/2010 | |
| CN | 103063122 | | 4/2013 | |
| CN | 103235349 | | 8/2013 | |
| CN | 103235349 A | * | 8/2013 | |
| CN | 203640726 U | * | 6/2014 | |
| CN | 204346357 | | 5/2015 | |
| CN | 204346357 U | * | 5/2015 | |
| CN | 105180795 | | 12/2015 | |
| CN | 205002729 | | 1/2016 | |
| CN | 106687826 A | * | 5/2017 | G01V 3/34 |
| CN | 107462146 | | 12/2017 | |
| CN | 107462146 A | * | 12/2017 | G01B 7/24 |
| CN | 107478196 | | 12/2017 | |
| CN | 207113861 | | 3/2018 | |
| CN | 207215005 | | 4/2018 | |
| CN | 112097633 | | 12/2020 | |
| EP | 0238922 A1 | * | 9/1987 | G01D 5/2033 |
| JP | H10185633 | | 7/1998 | |
| JP | H11304429 | | 11/1999 | |

OTHER PUBLICATIONS

Yang, Jie et al., "Design of Real-time Monitoring Underground Displacement System," Instrumentation Technology, No. 5, May 2008, pp. 20-23.

"International Search Report (Form PCT/ISA210) of PCT/CN2021/124505," mailed on Jan. 27, 2022, with English translation thereof, pp. 1-6.

* cited by examiner

UNDERGROUND THREE-DIMENSIONAL DISPLACEMENT MEASUREMENT SYSTEM AND METHOD BASED ON DOUBLE MUTUAL INDUCTANCE EQUIVALENT VOLTAGE

CROSS-REFERENCE TO RELATED APPLICATION

This application is a 371 of international application of PCT application serial no. PCT/CN2021/124505, filed on Oct. 18, 2021, which claims the priority benefit of China application no. 202010934577.5, filed on Sep. 8, 2020. The entirety of each of the above mentioned patent applications is hereby incorporated by reference herein and made a part of this specification.

TECHNICAL FIELD

The disclosure relates to an underground displacement measurement system and method, and in particular, to an underground displacement three-dimensional measurement system and method based on the principle of detecting a double mutual inductance equivalent voltage.

DESCRIPTION OF RELATED ART

China is one of the countries where geological disasters occur most frequently. Geological disasters in China are diverse, widely distributed, frequently active, and seriously harmful. According to statistics, various types of geological disasters cause an average of more than 1,000 deaths and economic losses of tens of billions in China every year. The cost of disaster prevention and reduction is extremely huge, which seriously restricts the sustainable development of social economy in disaster-prone areas and threatens the safety of people's lives and property. Underground displacement monitoring is an important part of geological disaster and geotechnical engineering deformation monitoring and is a key technical method to accurately detect the underground displacement information of the disaster body and the change dynamics of geological structure parameters, to determine the potential slip surface, and to study the disaster conditions, development trend, and disaster prevention forecast.

At present, measurement technologies applying inclinometers, extensometers, settlement meter, BOTDR and the like are mainly used at home and abroad to monitor the deformation of underground rock-soil mass in a single direction. Among the above, the inclinometers are widely used in the measurement of the underground horizontal displacement of sliding bodies due to their simple structure and high reliability. However, the efficiency of this monitoring method is low, and manual reading is required for each measurement, which may easily lead to missed reports of dangerous situations. Further, when the deformation of the surrounding rock-soil mass is excessively large, it is easy to cause an inclinometer tube to bend excessively, so the tube body is not smooth, and that the inclinometer probe cannot slide normally in the inclinometer tube. As a result, the measurement has to be terminated. The settlement meters and extensometers are mainly used to detect underground vertical displacements, so it is difficult to eliminate errors caused by horizontal displacements when these meters are applied. The BOTDR measurement method cannot be used to determine the deformation direction of the rock-soil mass. Further, the main problem of this method is that the amount of stretching is insufficient, so the optical fiber may be broken easily when extensive or rapid geotechnical deformation occurs.

Although the above methods have their own advantages and disadvantages, a common limitation is that all of the above methods cannot be used to monitor the three-dimensional changes of underground displacement. Only by monitoring the three-dimensional changes of underground displacement can geological disasters such as landslides be predicted and forecasted accurately and effectively.

SUMMARY

In order to overcome the shortcomings in the related art mentioned above, the disclosure aims to provide an underground displacement three-dimensional measurement system and method based on a double mutual inductance voltage capable of achieving three-dimensional distributed remote measurement of deformation.

The technical solutions adopted by the disclosure includes the following.

1. The disclosure provides an underground displacement three-dimensional measurement system based on a double mutual inductance equivalent voltage.

The system comprises an on-site measuring device and a remote monitoring system, and the on-site measuring device and the remote monitoring system are connected via a wireless communication network. Herein, the on-site measuring device is mainly formed by N integrated underground displacement measurement sensing units and one underground displacement information lumping unit connected in series by means of a power line and a communication line. The N integrated underground displacement measurement sensing units are serially connected and then are connected between an underground immovable layer and the ground. Each of the integrated underground displacement measurement sensing units is mainly formed by an external PVC sleeve, a cylindrical air-core coil, a cylindrical magnetic core coil, and a PCB. The cylindrical air-core coil and the cylindrical magnetic core coil are both installed in the PVC sleeve. The cylindrical air-core coil is located around an inner surface of the PVC sleeve, and the cylindrical magnetic core coil is located in the center of the cylindrical air-core coil. The cylindrical air-core coil, the cylindrical magnetic core coil, and the PVC sleeve share a same central axis. The PCB is arranged in a middle portion of the PVC sleeve in an axial direction.

The PCB is integrated with modules such as an MCU, a sine wave generating circuit, a double mutual inductance voltage measuring circuit, an attitude measuring circuit, and a 485 communication circuit. The cylindrical air-core coil and the cylindrical magnetic core coil are connected to the power supply respectively through a first analog switch and a second analog switch. The cylindrical air-core coil is connected to a first sine wave generating circuit and the double mutual inductance voltage measuring circuit through the first analog switch. The double mutual inductance voltage measuring circuit is connected to the MCU through an A/D conversion circuit. The cylindrical magnetic core coil is connected to a second sine wave generating circuit through the second analog switch. The first sine wave generating circuit, the second sine wave generating circuit, and the attitude measuring circuit are all connected to the MCU directly. The attitude measuring circuit and the MCU are both connected to the power supply. The MCU is connected to a host of the underground displacement information lumping unit through a 485 communication line.

The underground displacement information lumping unit includes a host, and the host includes an MCU main control circuit, a 485 bus driver module, a GPS measurement module, and a remote communication module. The MCU main control circuit is connected to the 485 bus driver module, the GPS measurement module, and the remote communication module. The MCU main control circuit connects and monitors the three modules of the 485 bus driver module, the GPS measurement module, and the remote communication module. The MCU main control circuit sends control commands to each underground displacement measurement integrated sensing unit through the 485 communication bus and sends measurement information of underground deformation to an upper computer of the remote monitoring system through the remote communication module.

The on-site measuring device and the remote monitoring system are connected through a wireless network for wireless communication. A measurement result of the on-site measuring device is transmitted to the remote monitoring system through the wireless network.

The remote monitoring system is mainly formed by a remote receiving device and an upper computer. One end of the remote receiving device is connected to a receiving antenna and the other end is connected to the upper computer. The upper computer obtains geotechnical deformation conditions and specific coordinate values from the ground surface to the deep underground in a measurement area through conversion and drawing and achieves three-dimensional distributed remote measurement of the geotechnical deformation from the ground surface to the deep underground.

Two adjacent integrated underground displacement measurement sensing units form one measurement unit. The lower integrated underground displacement measurement sensing unit is treated as a relative reference unit, and the upper integrated underground displacement measurement sensing unit is treated as a relative displacement unit. In each measurement unit, relative horizontal displacement and relative vertical displacement between two adjacent integrated underground displacement measurement sensing units are measured by means of cooperation between the cylindrical air-core coil and the cylindrical magnetic core coil of the relative reference unit and the cylindrical air-core coil of the relative displacement unit and are treated as a relative displacement and direction measurement result of the measurement unit.

2. The disclosure further provides an underground displacement three-dimensional measurement method based on a double mutual inductance equivalent voltage.

Under the control of an underground displacement information lumping unit, each integrated underground displacement measurement sensing unit is controlled through the underground displacement information lumping unit. Each measurement unit formed by two adjacent integrated underground displacement measurement sensing units is controlled one by one from bottom to top to measure in sequence. The relative displacement and direction measurement result of each measurement unit is obtained through double mutual inductance voltage equivalent modeling, least squares curve fitting, and sensing attitude analyzing. The relative displacement and direction measurement results of the measurement units are comprehensively accumulated, and three-dimensional distributed flexible measurement of the deformation conditions of the rock-soil mass from the ground surface to the deep underground is achieved.

The on-site measuring device is buried between the immovable layer and the ground of the rock-soil mass need to be measured through drilling. Two adjacent integrated underground displacement measurement sensing units form one measurement unit, the lower integrated underground displacement measurement sensing unit in the measurement unit is treated as the relative reference unit, and the upper integrated underground displacement measurement sensing unit is treated as a relative displacement unit. The measurement is carried out according to the following steps to measure a type I mutual inductance voltage $U_I$, a type II mutual inductance voltage $U_{II}$, a relative tilt angle $\theta$, and an azimuth angle $\varphi$:

An excitation signal is sent to the relative reference unit by the sine wave generating circuit first, and a sine wave with a fixed frequency and amplitude is connected to the cylindrical air-core coil of the relative reference unit by controlling an analog switch. The cylindrical magnetic core coils of the relative reference unit and the relative displacement unit are powered off. A measurement signal is sent to the relative displacement unit, and a mutual inductance voltage in the cylindrical air-core coil of the relative displacement unit is collected as the type I mutual inductance voltage $U_I$. An excitation signal is sent to the relative reference unit by the sine wave generating circuit, and a sine wave is connected to the cylindrical magnetic core coil of the relative reference unit by switching the analog switch. The cylindrical air-core coil of the relative reference unit and the cylindrical magnetic core coils of the relative displacement unit are powered off. A measurement signal is sent to the relative displacement unit, and the mutual inductance voltage in the cylindrical air-core coil of the relative displacement unit is collected as the type II mutual inductance voltage $U_{II}$. The MCU controls the attitude measuring circuit to simultaneously measure the relative tilt angle (axis angle) $\theta$ and the azimuth angle $\varphi$ between the relative displacement unit and the relative reference unit.

The relative displacement of each integrated underground displacement measurement sensing unit of the measuring device is driven when the rock-soil mass undergoes underground displacement, and the type I mutual inductance voltage $U_I$ and the type II mutual inductance voltage $U_{II}$ both change in real time. The time changes of type I mutual inductance voltage $U_I$ and the type II mutual inductance voltage $U_{II}$ are collected and recorded. The time-varying curve takes time as the abscissa and the mutual inductance voltage as the ordinate, and two different mutual inductance voltage contours are obtained. The coordinates of the intersection point between the two mutual inductance voltage contours are the relative displacement between two adjacent integrated underground displacement measurement sensing units.

The attitude measuring circuit is configured to detect in real time the tilt angle $\theta$ and the geomagnetic azimuth angle $\varphi$ of each integrated underground displacement measurement sensing unit, and the geomagnetic azimuth angle $\varphi$ is configured to judge the underground displacement direction. A relationship model is established between the horizontal displacement and the vertical displacement through the type I mutual inductance voltage $U_I$ and the type II mutual inductance voltage $U_{II}$ respectively under different tilt angles $\theta$ through a least squares curve fitting method. The type I mutual inductance voltage $U_I$ and the type II mutual inductance voltage $U_{II}$ are input into the relationship model, and two different mutual inductance voltage contours are obtained. The coordinates of the intersection point between the two mutual inductance voltage contours are the relative displacement between two adjacent integrated underground displacement measurement sensing units, so that the coordinates of the intersection point are accurately calculated. The relative displacement measurement between two integrated underground displacement measurement sensing units in the measurement unit are completed.

Each measurement unit formed by two adjacent integrated underground displacement measurement sensing units is controlled one by one from bottom to top to measure in sequence. The relative displacement and direction measurement results of N−1 measurement units are comprehensively accumulated, underground three-dimensional coordinates are unified, and the rock-soil deformation conditions and the specific coordinate values from the ground surface to the deep underground are obtained.

Specifically combined with the ground GPS spatial coordinate measurement, from the bottom to the top, the sensing units measure the three-dimensional coordinates of the underground deformation uniformly corresponding to the spatial coordinates one by one. On-site measurement results can be sent to the remote monitoring center via the wireless network. The host computer in the remote monitoring center further depicts the geotechnical deformation conditions and computes specific coordinate values from the ground surface to the deep underground in a measurement area, and the three-dimensional distributed remote measurement of the geotechnical deformation from the ground surface to the deep underground is thereby completed.

The measurement units are turned on sequentially from bottom to top one by one for measurement, and only one measurement unit is turned on for each measurement. When one measurement unit is measuring, the other measurement units are not working to avoid mutual crosstalk.

In the disclosure, the double mutual inductance voltages $U_I$ and $U_{II}$, the tilt angle $\theta$, and the azimuth angle $\varphi$ of each measurement unit are obtained from the bottom-up measurement according to the underground displacement information lumping unit. The corresponding $\theta$-R-Z-$U_I$ and $\theta$-R-Z-$U_{II}$ models are searched and found. The relative displacement between adjacent sensing units are obtained by fitting two voltage contours through the least squares method and solving the two voltage contours. By accumulating the relative displacement of N−1 adjacent sensing units, the three-dimensional distributed measurement of the deformation of rock-soil mass from the ground surface to the deep underground is achieved.

The disclosure is a new method and device for three-dimensional distributed measurement of underground displacement of rock-soil mass based on a flexible integrated sensing array structure which integrates various magneto-electric effects such as electromagnetism, mutual inductance, and magnetic resistance effects. The mapping transfer relationship between the characteristic physical quantities such as double mutual inductance voltage and magneto-resistance voltage and the three-dimensional coordinate change of underground deformation of the rock-soil mass is established. The three-dimensional measurement model and solution method of underground displacement are constructed to achieve the accurate measurement of three-dimensional displacement and displacement directions of rock-soil mass from the ground surface to the underground at different depths.

Beneficial effects provided by the disclosure include the following.

In the disclosure, the three-dimensional distributed measurement of the deformation conditions of the entire rock-soil mass from the ground surface to the deep underground in the measurement area is completed. The three-dimensional displacement and the displacement directions are simultaneous measured, and the measurement is automatically and remotely performed in real time in the measuring process.

In the figures, 1, 4: the 485 communication bus, 5: the first sensing unit, 6: N−$1^{th}$ sensing unit, 7: immovable layer, 8: host computer, 9: remote monitoring system platform, 10: wireless network, 11: PVC soft plastic tube, 12 PVC sleeve, 13: cylindrical air-core coil, 14: cylindrical magnetic core coil, and 15: PCB.

DESCRIPTION OF THE EMBODIMENTS

The disclosure is further described in detail in combination with accompanying figures and embodiments.

Figure 1:
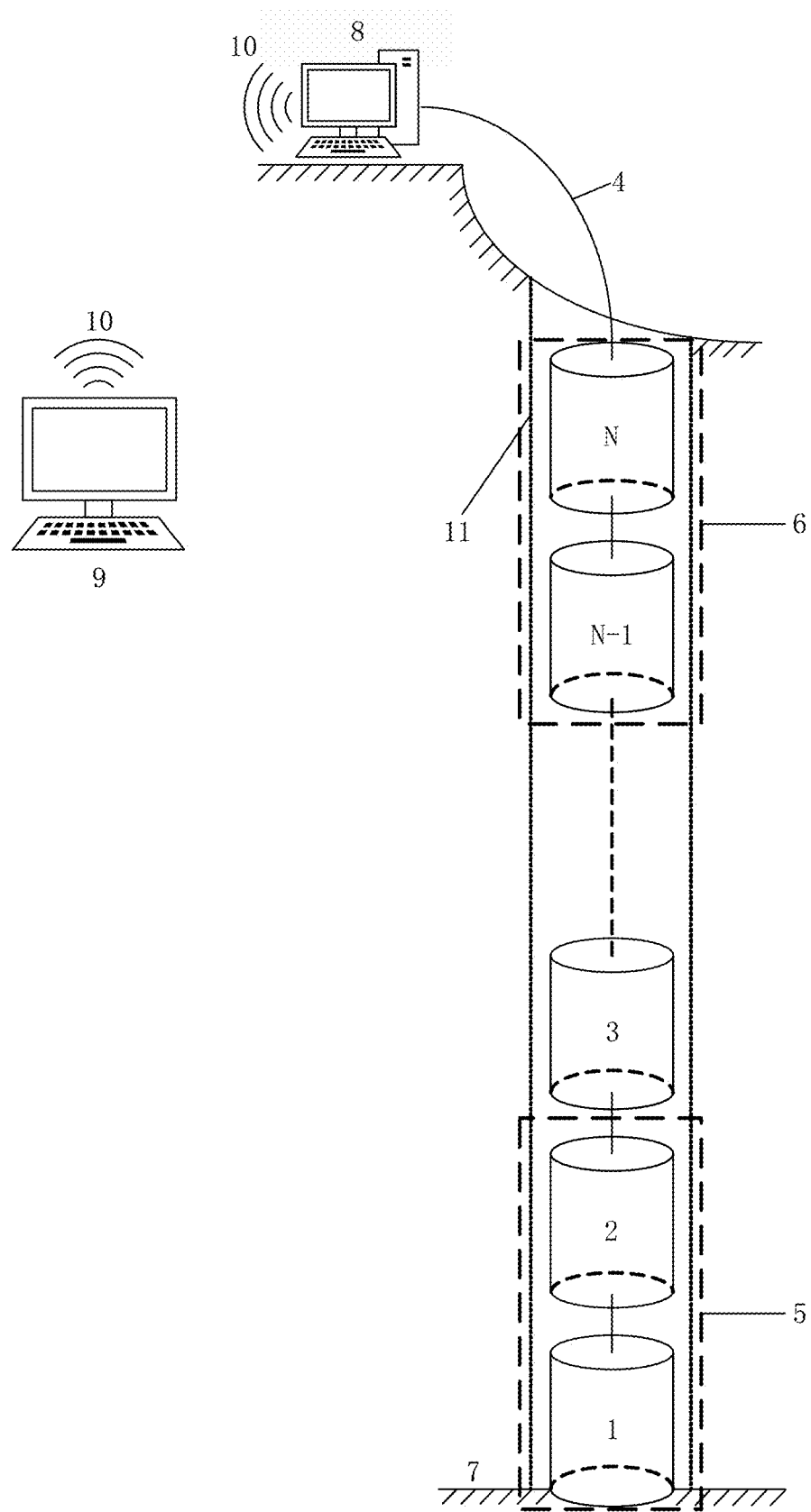
FIG. 1 is a schematic structural view of an underground displacement three-dimensional measurement system.

As shown in FIG. 1, in specific implementation, a system includes an on-site measurement device and a remote monitoring system, and the on-site measuring device and the remote monitoring system are connected via a wireless communication network. Herein, the on-site measuring device is mainly formed by N integrated underground displacement measurement sensing units 1 and one underground displacement information lumping unit connected in series by means of a power line and a communication line. The N integrated underground displacement measurement sensing units 1 are serially connected and then are connected between an underground immovable layer 7 and the ground. The structures of the integrated underground displacement measurement sensing units are exactly the same. The integrated underground displacement measurement sensing units are connected in series through the power line and a 485 bus to form a sensing array, which is set in a PVC soft plastic tube 11 and is vertically embedded in the rock-soil mass to be measured through drilling.

Figure 2:
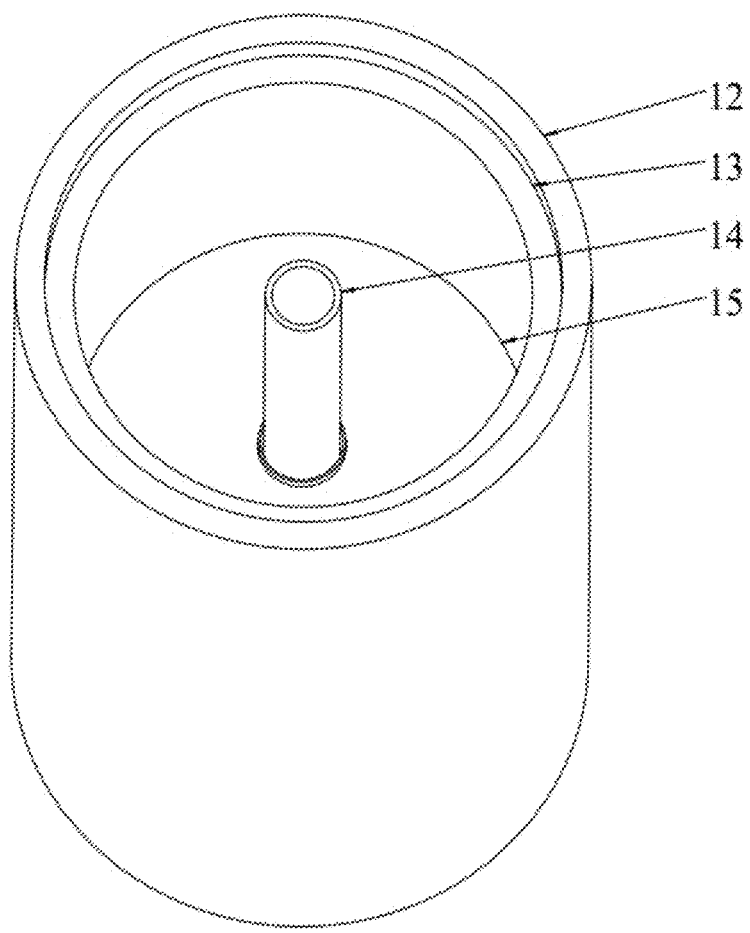
FIG. 2 is a schematic structural view of an integrated underground displacement measurement sensing unit.

As shown in FIG. 2, each of the integrated underground displacement measurement sensing units 1 is mainly formed by an external PVC sleeve 12, a cylindrical air-core coil 13, a cylindrical magnetic core coil 14, and a PCB 15. The cylindrical air-core coil 13 and the cylindrical magnetic core coil 14 are both installed in the PVC sleeve 12. The cylindrical air-core coil 13 is located around an inner surface of the PVC sleeve 12, and the cylindrical magnetic core coil 14 is located in the middle of the cylindrical air-core coil 13. The cylindrical air-core coil 13, the cylindrical magnetic core coil 14, and the PVC sleeve 12 share a same central axis. The PCB 15 is arranged in a middle portion of the PVC sleeve 12 in an axial direction. After being put into a mounting bracket, the PCB 15 and the cylindrical magnetic core coil 14 are embedded into a slot on an inner wall of the cylindrical air-core coil 13 and are fixed, and the mounting bracket is shown in FIG. 2. The cylindrical air-core coil 13 and the cylindrical magnetic core coil 14 constitute a double mutual inductance voltage measurement structure and are respectively connected to a double mutual inductance voltage type I measuring circuit and a double mutual inductance voltage type II measuring circuit.

The structures of the integrated underground displacement measurement sensing units 1 are exactly the same and are columnar axisymmetric structures. The outside of each structure is the thick-walled PVC sleeve, and the inside of the PVC sleeve has the cylindrical air-core coil, the cylindrical magnetic core coil, and the PCB. The upper and lower ends of the PVC sleeve are sealed with glue. The integrated underground displacement measurement sensing units 1 are connected in series through the power line and the 485 bus.

Figure 3:
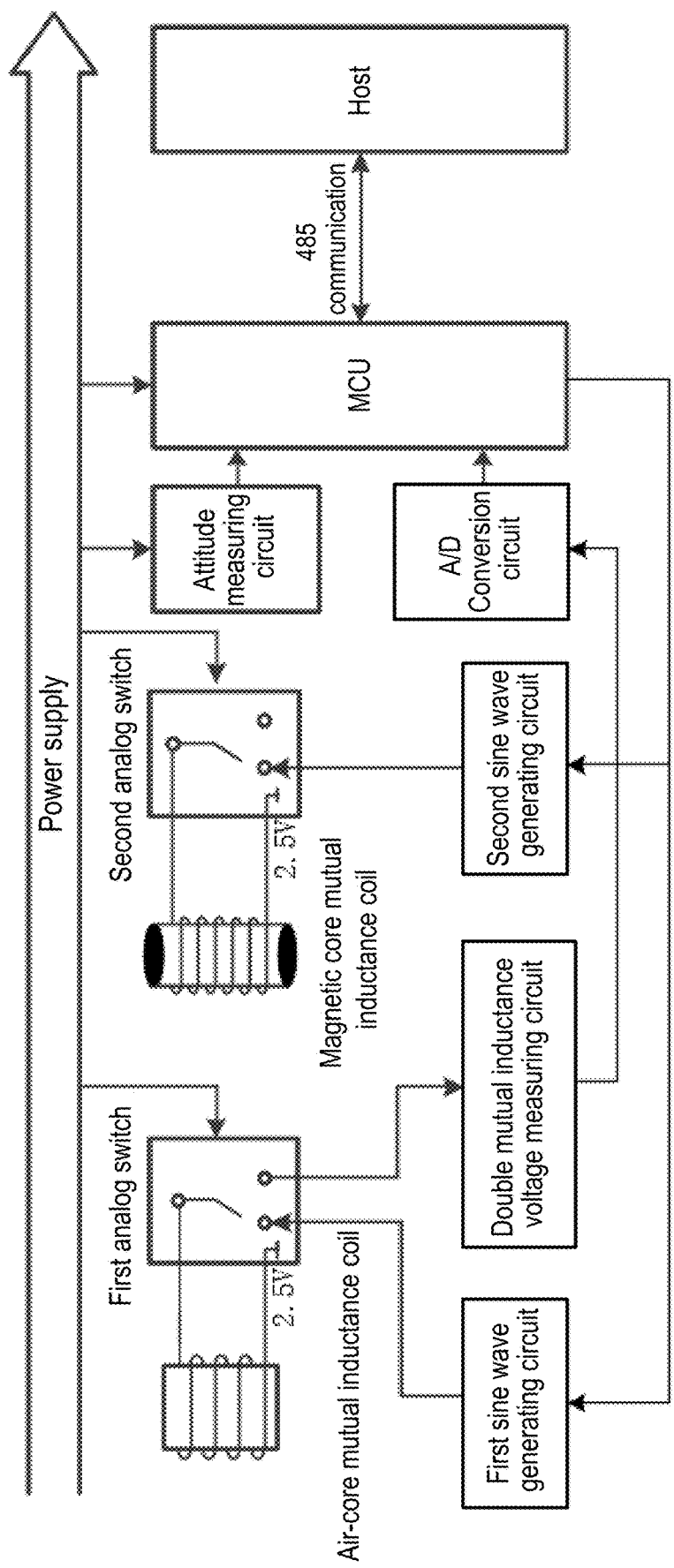
FIG. 3 is a working block diagram of circuits of a PCB.

As shown in FIG. 3, the PCB 15 is integrated with modules such as an MCU, a sine wave generating circuit, a double mutual inductance voltage measuring circuit, an attitude measuring circuit, and a 485 communication circuit. The cylindrical air-core coil 13 and the cylindrical magnetic core coil 14 are connected to the power supply through the first analog switch and the second analog switch respectively. The cylindrical air-core coil 13 is connected to the first sine wave generating circuit and the double mutual inductance voltage measuring circuit through the first analog switch. The double mutual inductance voltage measuring circuit is connected to the MCU through an A/D conversion circuit. The cylindrical magnetic core coil 14 is connected to the second sine wave generating circuit through the second analog switch. The first sine wave generating circuit, the second sine wave generating circuit, and the attitude measuring circuit are all connected to the MCU directly. The attitude measuring circuit is configured to measure the geomagnetic azimuth angle and the tilt angle. The attitude measuring circuit and the MCU are both connected to the power supply. The power supply is connected to the first analog switch, the second analog switch, the attitude measuring circuit, and the MCU through the power line. The MCU is connected to a host 8 of the underground displacement information lumping unit through a 485 communication line 4. The MCU calculates individual underground displacement conditions of the integrated underground displacement measurement sensing units 1.

The MCU sends a sinusoidal excitation signal to the first sine wave generating circuit, controls the cylindrical air-core coil 13 to be energized with a sinusoidal current to emit a sinusoidally-varying electromagnetic field, and measures the mutual inductance voltage passing through the cylindrical air-core coil 13 through the double mutual inductance voltage measuring circuit. The MCU sends a sinusoidal excitation signal to the second sine wave generating circuit, controls the cylindrical magnetic core coil 14 to be energized with a sinusoidal current to emit a sinusoidally-varying electromagnetic field, and measures the mutual inductance voltage passing through the cylindrical air-core coil 13 through the double mutual inductance voltage measuring circuit. At the same time, the attitude measuring circuit measures and sends the geomagnetic azimuth angle and the tilt angle of each integrated underground displacement measurement sensing unit 1 itself to the MCU. The MCU collects and sends the geomagnetic azimuth angle and the tilt angle to the host 8 of the underground displacement information lumping unit, and the host 8 performs calculations based on the geomagnetic azimuth angle and the tilt angle.

The underground displacement information lumping unit includes the host 8, and the host 8 includes an MCU main control circuit, a 485 bus driver module, a GPS measurement module, and a remote communication module. The MCU main control circuit is connected to the 485 bus driver module, the GPS measurement module, and the remote communication module. The MCU main control circuit connects and monitors the three modules of the 485 bus driver module, the GPS measurement module, and the remote communication module. The MCU main control circuit sends a control signal to each underground displacement measurement integrated sensing unit 1 through the 485 communication bus 4 and sends measurement information of underground deformation to an upper computer 9 of the remote monitoring system platform through the remote communication module.

The on-site measuring device and the remote monitoring system are connected through a wireless network 10 for wireless communication. A measurement result of the on-site measuring device is transmitted to the remote monitoring system platform through the wireless network 10.

The remote monitoring system is mainly formed by a remote receiving device and the upper computer 9. One end of the remote receiving device is connected to a receiving antenna and the other end is connected to the upper computer 9. The upper computer 9 includes a PC and a portable terminal device. The upper computer 9 obtains geotechnical deformation conditions and specific coordinate values from the ground surface to the deep underground in a measurement area through conversion and drawing and achieves three-dimensional distributed remote measurement of the geotechnical deformation from the ground surface to the deep underground.

Two adjacent integrated underground displacement measurement sensing units 1 form one measurement unit, and N sensing units form N−1 measurement units in total, such as the first measurement unit 5 at the bottom and the N−1 measurement unit 6 at the top. In one measurement unit, the lower integrated underground displacement measurement sensing unit 1 is treated as a relative reference unit, and the upper integrated underground displacement measurement sensing unit 1 is treated as a relative displacement unit. In each measurement unit, relative horizontal displacement and relative vertical displacement between two adjacent integrated underground displacement measurement sensing units 1 are measured by means of cooperation between the cylindrical air-core coil 13 and the cylindrical magnetic core coil 14 of the relative reference unit and the cylindrical air-core coil 13 of the relative displacement unit and are treated as a relative displacement and direction measurement result of the measurement unit.

In each measurement unit, the lower sensing unit is treated as the relative reference unit (sensing unit A), and the upper one is treated as the relative displacement unit (sensing unit B). For any sensing unit, when the sensing unit is treated as the relative reference unit, the MCU is mainly configured to excite the cylindrical air-core coil and the cylindrical magnetic core coil, generate a sine wave with a fixed frequency and amplitude through the sine wave generating circuit, and control the analog switch to sequentially connect the sine wave to the cylindrical air-core coil and the cylindrical magnetic core coil as the excitation signal. When it works as the relative displacement unit (the sensing unit B), the MCU is mainly configured to collect the mutual inductance voltage and attitude information. Herein, the mutual inductance voltage is configured to amplify, filter, and rectify the double mutual inductance voltages $U_I$ and $U_{II}$ ($U_I$ is the mutual inductance voltage between the cylindrical air-core coil of sensing unit A and the cylindrical air-core coil of sensing unit B, and $U_{II}$ is the mutual inductance voltage between the cylindrical magnetic core coil of sensing unit A and the cylindrical air-core coil of sensing unit B) to become direct current signals, which are then collected and processed by the MCU through the A/D conversion circuit. The attitude measuring circuit is able to measure an axis angle θ (tilt angle) between adjacent sensing units and a deflection angle φ (azimuth angle) of the relative measurement unit to the z-axis.

Figure 4:
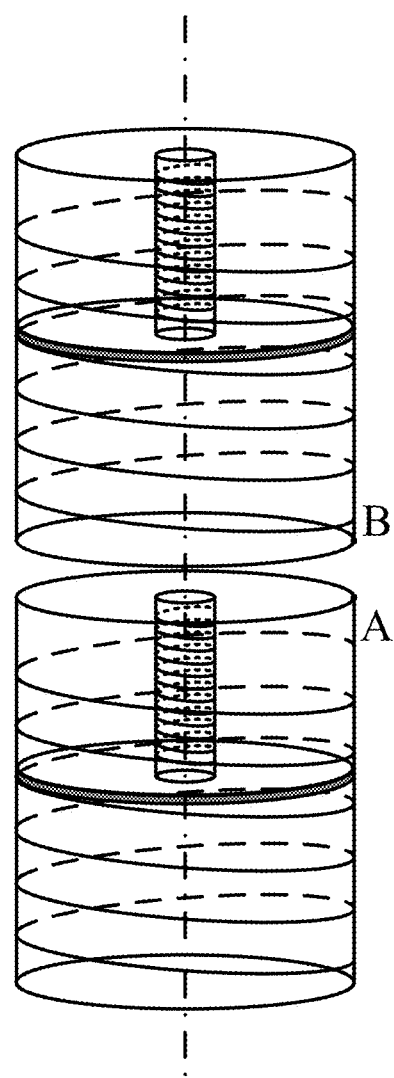
FIG. 4 is a schematic diagram of measurement units without relative displacement.
Figure 5:
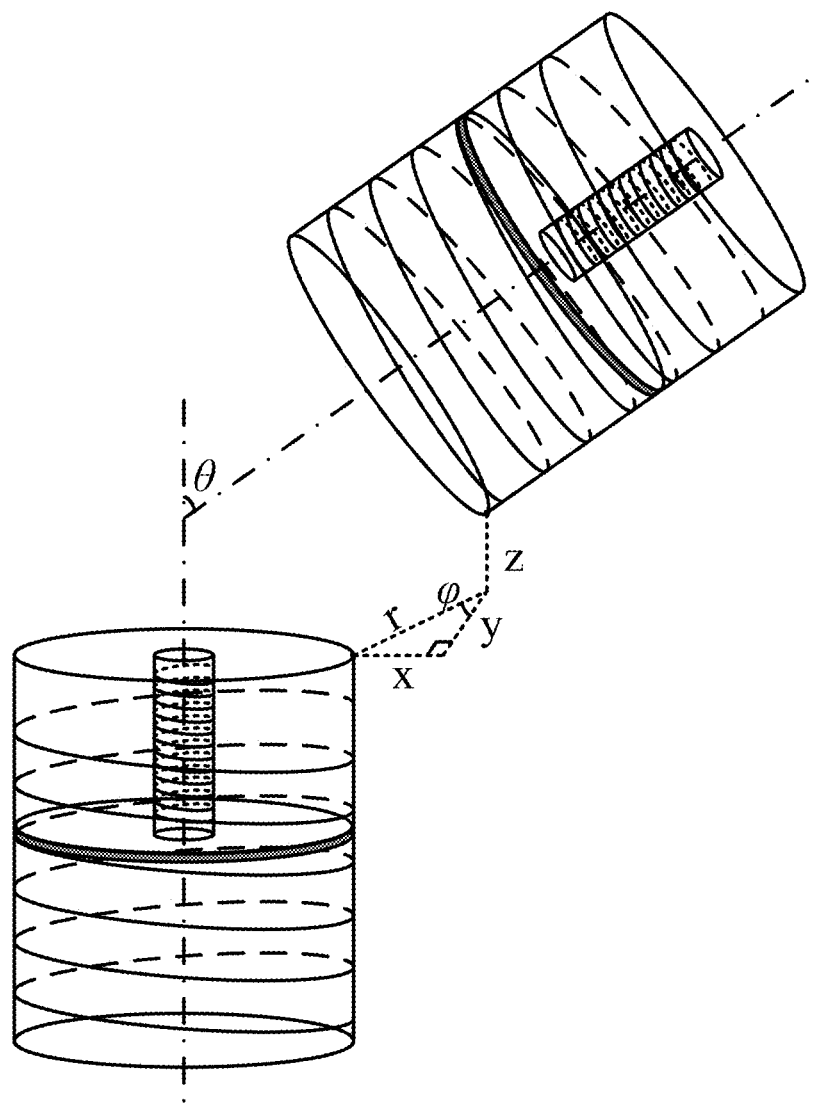
FIG. 5 is a schematic diagram of the measurement units moving in the direction of deflection angle $\varphi$.

When the underground displacement of the rock-soil mass occurs, it drives the relative displacement of each sensing unit in the sensing array in different directions and angles. Taking one measurement unit as an example, the schematic diagrams before and after underground displacement are shown in FIG. 4 and FIG. 5. After the displacement occurs, the mutual inductance voltage (type I mutual inductance voltage, $U_I$) between the cylindrical air-core coil and the cylindrical air-core coil of any two adjacent sensing units and the mutual inductance voltage (type II mutual inductance voltage, $U_{II}$) between the cylindrical magnetic core coil and the cylindrical air-core coil change simultaneously, and the axis angle θ and the azimuth angle φ between adjacent sensing units also change synchronously.

In one measurement unit, the lower integrated underground displacement measurement sensing unit 1 is treated as the relative reference unit, and the upper integrated underground displacement measurement sensing unit 1 is treated as the relative displacement unit. At this time, the measuring lumping unit sends excitation and measurement instructions to the MCU in each measurement unit sequentially from bottom to top through the 485 bus.

(1) An excitation command is sent to the relative reference unit, and an analog switch is controlled to connect a sine wave with a fixed frequency and amplitude to the hollow cylindrical coil 13 of the relative reference unit.

(2) A measurement instruction is sent to the relative displacement unit, and a mutual inductance voltage in the cylindrical air-core coil 13 of the relative displacement unit is collected as the type I mutual inductance voltage $U_I$.

(3) An excitation command is sent to the relative reference unit, the analog switch is switched to connect a sine wave to the cylindrical magnetic core coil 14 of the relative reference unit, and the cylindrical air-core coil 13 is powered off.

(4) A measurement instruction is sent to the relative displacement unit, and the mutual inductance voltage in the cylindrical air-core coil 13 of the relative displacement unit is collected as the type II mutual inductance voltage $U_{II}$.

(5) The MCU controls the attitude detection module to simultaneously measure the relative tilt angle (axis angle) θ and the azimuth angle φ between the relative displacement unit and the relative reference unit.

Meanwhile, both the cylindrical air-core coil and the cylindrical magnetic core coil of the relative reference unit are powered off, so as to prevent the magnetic field generated when the abovementioned mutual inductance coil is powered on from affecting the accuracy of attitude detection.

In this way, the measurement of a specific measurement unit is completed, and the same is true for other measurement units. After a measurement is completed, the underground displacement information lumping unit sequentially receives data such as the double mutual inductance voltages $U_I$ and $U_{II}$, the tilt angle θ, and the azimuth φ output by each measurement unit from bottom to top, substitutes the data into the underground displacement three-dimensional measurement model provided by the disclosure, and obtains the relative horizontal and vertical displacement ($x_k$, $y_k$, $z_k$) and an azimuth angle $\varphi_k$ of the measurement unit.

The measurement results of N−1 measurement units are accumulated to measure the overall displacement and direction (X, Y, Z, Φ) and $X=\Sigma_{k=1}^{N-1}x_k$, $Y=\Sigma_{k=1}^{N-1}y_k$, $Z=\Sigma_{k=1}^{N-1}z_k$, and $\Phi=\Sigma_{k=1}^{N-1}\varphi_k$ of the rock-soil mass from the ground surface to the deep underground, where X, Y, Z, and Φ respectively represent the horizontal displacement in one direction, the horizontal displacement in another direction, the vertical displacement in the gravity direction, and the azimuth angle direction, and the one horizontal direction is orthogonal to the another horizontal direction.

Combined with the ground GPS spatial coordinate measurement, the three-dimensional coordinates of underground deformation corresponding to the spatial coordinates can be measured one by one from bottom to top by each group of measurement units. On-site measurement results can be sent to the remote monitoring system via the wireless network.

The measurement method of the disclosure adopts the principle of double electromagnetic mutual inductance which is different from the existing principle of multiple mutual inductance. As shown in FIG. 4 and FIG. 5, any measurement unit k is formed by two sensing units adjacent up and down, which are called a relative displacement unit (A) and a relative reference unit (B) respectively. As the rock-soil mass around the measurement unit slides, the relative horizontal displacements $x_k$ and $y_k$, vertical displacement $z_k$, tilt angle $\theta_k$, and the azimuth angle $\varphi_k$ between two adjacent sensing units A and B may change.

According to the theory of magnetoelectric induction, when a sinusoidal voltage signal (the effective value is set to $U_i$) with a fixed frequency and amplitude is sent into the cylindrical air-core or magnetic core coil of a relative measurement unit A, a sinusoidal mutual inductance voltage $U_o$ with the same frequency but a different amplitude is generated in the cylindrical air-core coil of a relative measurement unit B:

$$U_o = \frac{U_i}{L}M$$

Herein, L is the self-inductance of the cylindrical air-core coil, which is only determined by the size, the geometric shape, and the number of turns of the coil, and can be regarded as a constant. M is the mutual inductance coefficient between the cylindrical air-core or magnetic core coil of the sensing unit A and the cylindrical air-core coil of the sensing unit B, which is determined by the geometric shape, the number of turns, and the relative position of the two coils.

The outside of the sensing unit is a thick-walled PVC sleeve and thus is not easily deformed and is corrosion-resistant. The shape of the coil is generally not damaged when the surrounding rock-soil mass deforms, so the change of M in the above formula is only related to the relative displacement between the two coils. It thus can be seen in the measuring device provided by the disclosure, the magnitude and change of the mutual inductance voltages $U_I$ and $U_{II}$ generated between adjacent sensing units can directly represent the relative position and relative displacement information between adjacent sensing units.

In the disclosure, the on-site measuring device is mainly formed by an information lumping unit placed on the ground and N integrated underground displacement measurement sensing units vertically embedded in the rock-soil mass through drilling and connected up and down in series. Any two adjacent sensing units form one measurement unit. When the underground displacement of the rock-soil mass occurs, it drives each sensing unit in the sensing array to tilt, horizontally displaced and vertically displaced. Both the mutual inductance voltage (type I mutual inductance voltage, $U_I$) between the cylindrical air-core coil and the cylindrical air-core coil of any two adjacent sensing units (A and B) and the mutual inductance voltage (type II mutual inductance voltage, $U_{II}$) between the cylindrical magnetic core coil and the cylindrical air-core coil change, and both the relative tilt angle θ and the azimuth angle φ between adjacent sensing units change synchronously. Two mutual inductance voltage contours may be obtained through the above-mentioned type I and type II mutual inductance voltage values ($U_I$ and $U_{II}$). There must be an intersection point between the two voltage contours, and the coordinates of the intersection point are the displacement of sensing unit B relative to sensing unit A.

Through theoretical proof and experimental verification, the relationship model between the double mutual inductance voltages $U_I$ and $U_{II}$ and the relative displacements x, y and z to be measured under different tilt angles θ and azimuth angles φ is obtained. Combined with the double mutual inductance voltage contour theory and least squares curve fitting method, the relative displacement size and direction ($x_k$, $y_k$, $z_k$, $\varphi_k$) between adjacent sensing units are reversely calculated.

Figure 6:
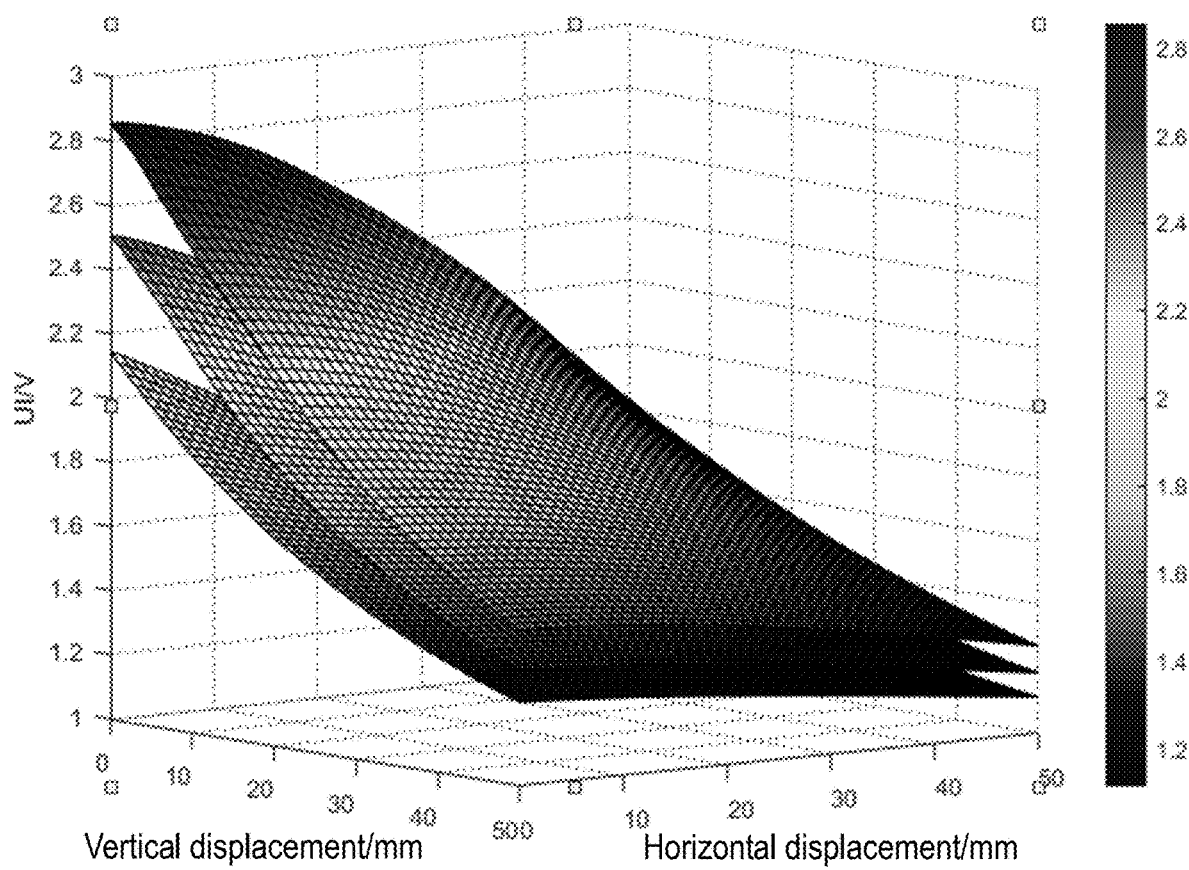
FIG. 6 is a surface plot of a three-dimensional relationship model among $U_I$, axis angle $\theta$, and relative displacement.
Figure 7:
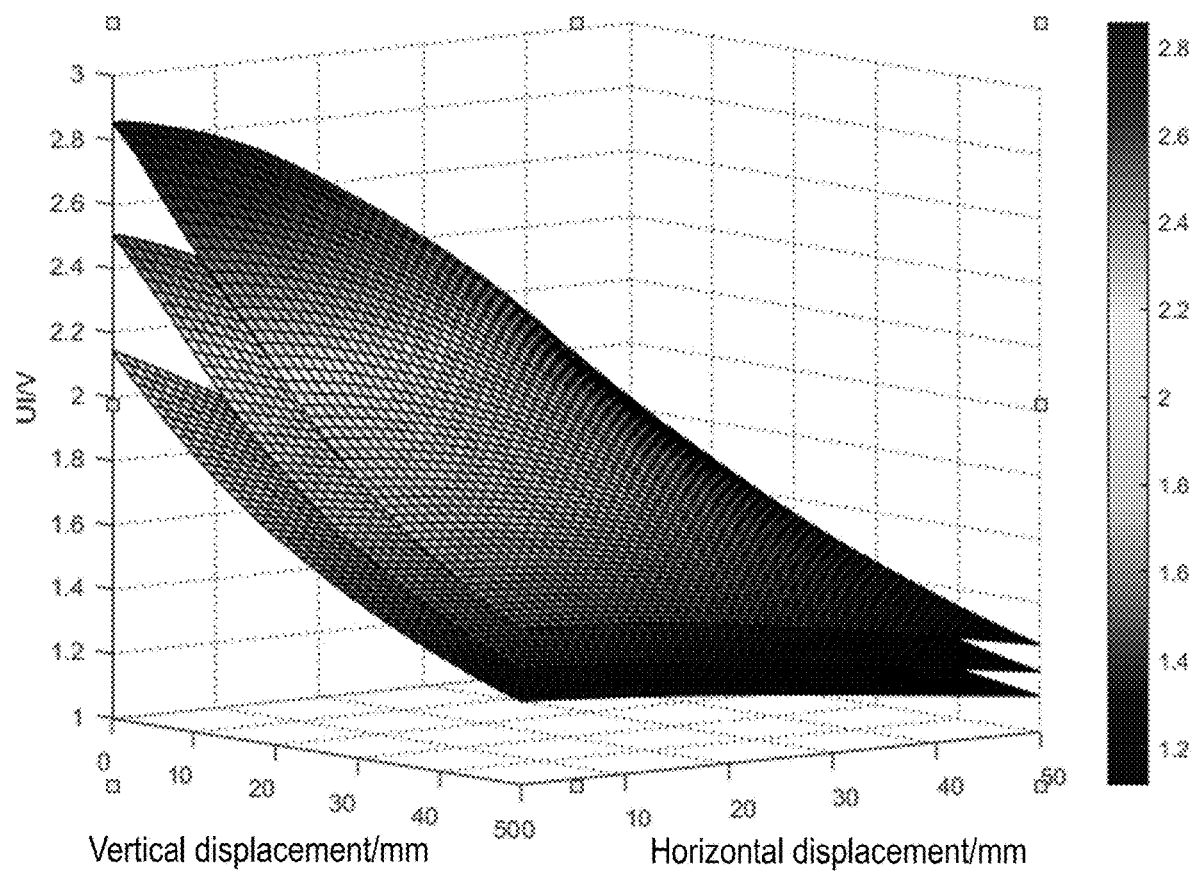
FIG. 7 is a surface plot of a three-dimensional relationship model among $U_{II}$, axis angle $\theta$, and relative displacement.
Figure 8:
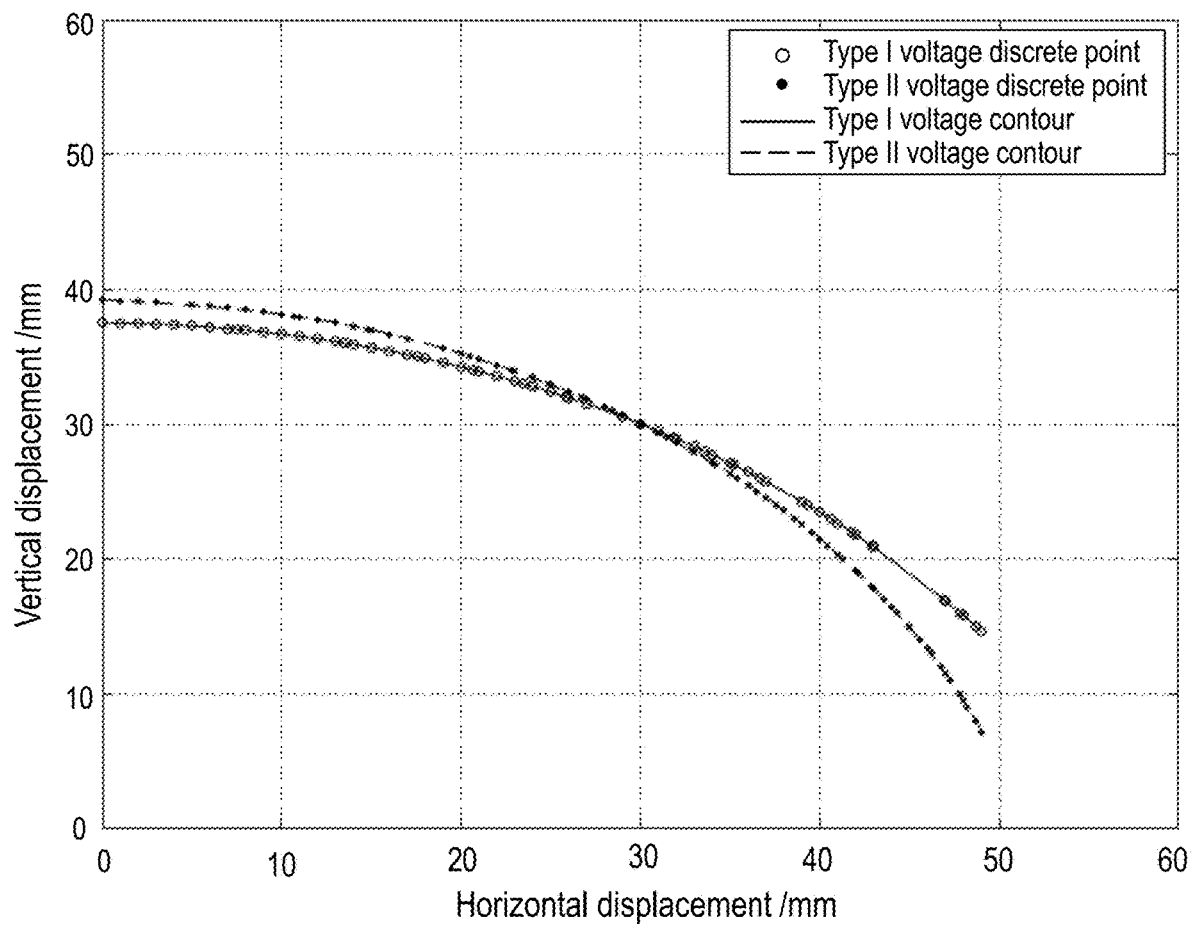
FIG. 8 is a contour plot of $U_I$ and $U_{II}$ voltages of two adjacent sensing units at relative displacements of (30 mm, 0 mm, and 30 mm).

First, through experimental calibration and theoretical modeling, the relationship model of the double mutual inductance voltages $U_I$ and $U_{II}$ changing with horizontal displacement and vertical displacement is obtained between adjacent sensing units A and B at different tilt angles θ, that is, θ-R-Z-$U_I$ and θ-R-Z-$U_{II}$. FIG. 6 and FIG. 7 are three-dimensional surface plots of the relationship among relative horizontal displacement, vertical displacement, and mutual inductance voltages $U_I$ and $U_{II}$ under different tilt angles. In the figures, the tilt angles corresponding to the three curved surfaces are 15°, 30°, and 45° from top to bottom, and the mutual inductance voltages $U_I$ and $U_{II}$ decrease with the increase of the relative displacement and tilt angle. Further, under the same tilt angle, the same mutual inductance voltage value may correspond to different horizontal displacement and vertical displacement, and the curve fitted to the points of the same voltage is called the voltage contour. As shown in FIG. 8, under the same tilt angle, each of the mutual inductance voltages $U_I$ and $U_{II}$ corresponds to one voltage contour. The two contours intersect at a point in space, and by determining the coordinates of the intersection point, the relative horizontal displacement $r_k$ and vertical displacement $z_k$ between any two adjacent sensing units can be obtained.

According to the tilt angle θ measured by the sensing unit, the corresponding θ-R-Z-$U_I$ and θ-R-Z-$U_{II}$ models are searched and found. The equivalent voltage discrete points of the double mutual inductance voltages $U_I$ and $U_{II}$ are obtained by traversal. Through the least squares curve fitting method, two voltage contours are then fitted and obtained. Lastly, the intersection point of the double equivalent voltage curves is accurately calculated by computer programming and is converted into the relative displacement of the adjacent sensing unit. FIG. 8 shows the double mutual inductance voltage contours obtained from the mutual inductance voltage values $U_I$ and $U_{II}$ at the tilt angle $\theta_k$=0°, horizontal displacement $r_k$=30 mm, and vertical displacement $z_k$=30 mm, and it can be seen that the two contours have only one intersection point.

The least squares fitting method is used to solve the expressions of the two fitting curves:

$$y_1 = -0.0000001757x^5 + 0.00002057x^4 - 0.0009243x^3 + 0.009424x^2 - 0.1169x + 37.55$$

$$y_2 = -0.0000007319x^5 + 0.00008027x^4 - 0.003225x^3 + 0.04449x^2 - 0.3253x + 39.39$$

The coordinates of the intersection point can be obtained by solving the two curves. Table 1 shows the displacement and error calculated by the least squares method when the tilt angle is 0 degree:

| Actual displacement/ mm | Horizontal displacement/ mm | Vertical displacement/ mm | Error/mm |
| --- | --- | --- | --- |
| (15, 15) | 14.751 | 15.045 | (−0.249, +0.045) |
| (20, 20) | 19.889 | 20.032 | (−0.111, +0.032) |
| (25, 25) | 23.836 | 25.495 | (−1.164, +0.495) |
| (30, 30) | 28.530 | 30.520 | (−1.470, +0.520) |
| (35, 35) | 34.960 | 35.076 | (+0.040, +0.076) |
| (40, 40) | 40.120 | 39.781 | (+0.120, −0.219) |
| (45, 45) | 45.326 | 44.744 | (+0.326, −0.256) |

It is verified by experiments that the errors of the horizontal displacement and the vertical displacement are within 2 mm.

The relative horizontal and vertical displacement ($r_k$, $z_k$) may be calculated by means of the contour and least squares fitting methods. However, in the actual underground rock-soil mass movement, it is impossible to judge in advance whether the underground displacement direction is consistent with the experimental calibration direction. The real three-dimensional measurement of underground displacement can only be achieved by combining the real-time measurement of the change of the azimuth angle $\varphi_k$ and the tilt angle $\theta_k$ of the displacement direction to obtain the inclination azimuth.

$$x_k r_k \sin \varphi_k$$

$$y_k = r_k \cos \varphi_k$$

To achieve the above, in the disclosure, a high-precision attitude measurement circuit is adopted in the sensing unit, and the attitude measurement circuit is integrated with a three-axis gyroscope, a three-axis accelerometer, and a three-axis magnetometer. When the attitude of a sensing unit changes, the attitude measurement circuit measures the X-axis tilt angle, Y-axis pitch angle, and Z-axis deflection angle in real time, and sends them to the MCU through serial communication. The MCU further sends the above to the underground displacement information lumping unit through the RS485 communication line and calculates the relative axial tilt angle and the geomagnetic azimuth angle between any two adjacent sensing units.

Taking one measurement unit as an example, as shown in FIG. 5, herein, the upper sensing unit is deflected around the z-axis, and the direction of the horizontal displacement r is no longer horizontal to the right but a deflection angle φ along the z-axis. That is, r moves in the direction of the deflection angle φ. Combining the horizontal displacement r and the vertical displacement z obtained by using the double mutual inductance voltage contour model, the components $x=r \sin \varphi$, $y=r \cos \varphi$ of the horizontal displacement in the x and y directions are decomposed and obtained. The same applies to other measurement units. In this way, the distributed measurement of the magnitude and direction of the three-dimensional displacement of the entire rock-soil mass from the ground surface to the deep underground is achieved.

What is claimed is:

1. An underground displacement three-dimensional measurement system based on a double mutual inductance equivalent voltage, comprising an on-site measuring device and a remote monitoring system, the on-site measuring device and the remote monitoring system are connected via a wireless communication network, wherein the on-site measuring device comprises N integrated underground displacement measurement sensing units and one underground displacement information lumping unit connected in series by means of a power line and a communication line, the N integrated underground displacement measurement sensing units are serially connected and then are connected between an underground immovable layer and a ground, wherein:

each of the integrated underground displacement measurement sensing units comprises an external PVC sleeve, a cylindrical air-core coil, a cylindrical magnetic core coil, and a PCB, the cylindrical air-core coil and the cylindrical magnetic core coil are both installed in the PVC sleeve, the cylindrical air-core coil is located around an inner surface of the PVC sleeve, the cylindrical magnetic core coil is located in the middle of the cylindrical air-core coil, the cylindrical air-core coil, the cylindrical magnetic core coil, and the PVC sleeve share a same central axis, and the PCB is arranged in a middle portion of the PVC sleeve in an axial direction.

2. The underground displacement three-dimensional measurement system based on the double mutual inductance equivalent voltage according to claim 1, wherein the PCB is integrated with modules comprising an MCU, a sine wave generating circuit, a double mutual inductance voltage measuring circuit, an attitude measuring circuit, and a 485 communication circuit, the cylindrical air-core coil and the cylindrical magnetic core coil are connected to a power supply respectively through a first analog switch and a second analog switch, the cylindrical air-core coil is connected to a first sine wave generating circuit and the double mutual inductance voltage measuring circuit through the first analog switch, the double mutual inductance voltage measuring circuit is connected to the MCU through an A/D conversion circuit, the cylindrical magnetic core coil is connected to a second sine wave generating circuit through the second analog switch, the first sine wave generating circuit, the second sine wave generating circuit, and the attitude measuring circuit are all connected to the MCU directly, the attitude measuring circuit and the MCU are both connected to the power supply, and the MCU is connected to a host of the underground displacement information lumping unit through a 485 communication bus.

3. The underground displacement three-dimensional measurement system based on the double mutual inductance equivalent voltage according to claim 1, wherein the underground displacement information lumping unit comprises a host, the host comprises an MCU main control circuit, a 485 bus driver module, a GPS measurement module, and a remote communication module, the MCU main control circuit is connected to the 485 bus driver module, the GPS measurement module, and the remote communication module, the MCU main control circuit connects and is configured to monitor three modules of the 485 bus driver module, the GPS measurement module, and the remote communication module, and the MCU main control circuit is configured to send a control signal to each underground displacement measurement integrated sensing unit through 485 communication bus and is configured to send measurement information of underground deformation to the host computer of the remote monitoring system through the remote communication module.

4. The underground displacement three-dimensional measurement system based on the double mutual inductance equivalent voltage according to claim 1, wherein the on-site measuring device and the remote monitoring system are connected through a wireless network for wireless communication, and a measurement result of the on-site measuring device is configured to transmitt to the remote monitoring system through the wireless network.

5. The underground displacement three-dimensional measurement system based on the double mutual inductance equivalent voltage according to claim 1, wherein the remote monitoring system comprises a remote receiving device and an upper computer, one end of the remote receiving device is connected to a receiving antenna and the other end of the remote receiving device is connected to the upper computer, and the upper computer is configured to obtain geotechnical deformation conditions and specific coordinate values from a ground surface to a deep underground in a measurement area through conversion and is configured to draw and achieve three-dimensional distributed remote measurement of the geotechnical deformation conditions from the ground surface to the deep underground.

6. The underground displacement three-dimensional measurement system based on the double mutual inductance equivalent voltage according to claim 1, wherein two adjacent integrated underground displacement measurement sensing units are configured to form one measurement unit, the lower integrated underground displacement measurement sensing unit is configured to treat as a relative reference unit, the upper integrated underground displacement measurement sensing unit is configured to treat as a relative displacement unit, in each measurement unit, the cylindrical air-core coil and the cylindrical magnetic core coil of the relative reference unit and the cylindrical air-core coil of the relative displacement unit are configured to cooperatively measure relative horizontal displacement and relative vertical displacement between two adjacent integrated underground displacement measurement sensing units, wherein the relative horizontal displacement and relative vertical displacement are treated as a relative displacement and direction measurement result of a measurement unit.

7. An underground displacement three-dimensional measurement method comprising the double mutual inductance voltage contour applied to the underground displacement three-dimensional measurement system according to claim 1, comprising:

controlling each integrated underground displacement measurement sensing unit through the underground displacement information lumping unit; controlling each measurement unit formed by two adjacent integrated underground displacement measurement sensing units one by one from bottom to top to measure in sequence; obtaining a relative displacement and direction measurement result of each measurement unit through double mutual inductance voltage contour modeling, least squares curve fitting, and sensing attitude analyzing; comprehensively accumulating the relative displacement and direction measurement results of the measurement units; and achieving three-dimensional distributed flexible measurement of a deformation of rock-soil mass from a surface to a deep underground.

8. The underground displacement three-dimensional measurement method based on the double mutual inductance equivalent voltage according to claim 7, wherein the on-site measuring device is buried between an immovable layer of the rock-soil mass to be measured and the ground through drilling, two adjacent integrated underground displacement measurement sensing units form one measurement unit, the lower integrated underground displacement measurement sensing unit in the measurement unit is treated as a relative reference unit, the upper integrated underground displacement measurement sensing unit is treated as a relative displacement unit, the measuring is carried out according to the following steps to measure a type I mutual inductance voltage, a type II mutual inductance voltage, a relative tilt angle, and an azimuth angle:

(1) sending an excitation command to the relative reference unit by a sine wave generating circuit first, connecting a sine wave with a fixed frequency and amplitude to the cylindrical air-core coil of the relative reference unit by controlling an analog switch, powering off the cylindrical magnetic core coil of the relative reference unit and the relative displacement unit, sending a measurement instruction to the relative displacement unit, and collecting a mutual inductance voltage in the cylindrical air-core coil of the relative displacement unit as the type I mutual inductance voltage;

(2) sending an excitation command to the relative reference unit by the sine wave generating circuit, connecting a sine wave to the cylindrical magnetic core coil of the relative reference unit by switching the analog switch, powering off the cylindrical air-core coil of the relative reference unit and the cylindrical magnetic core coil of the relative displacement unit, sending a measurement instruction to the relative displacement unit, and collecting the mutual inductance voltage in the cylindrical air-core coil of the relative displacement unit as the type II mutual inductance voltage;

(3) simultaneously measuring the relative tilt angle and the azimuth angle between the relative displacement unit and the relative reference unit by controlling an attitude measuring circuit by an MCU, the relative displacement of each integrated underground displacement measurement sensing unit of the on-site measuring device will be driven when the rock-soil mass undergoes underground displacement, wherein the type I mutual inductance voltage and the type II mutual inductance voltage both change in real time, collecting and recording the time changes of type I mutual inductance voltage and the type II mutual inductance voltage, obtaining two different mutual inductance voltage contours, wherein coordinates of an intersection point between two mutual inductance voltage contours are the relative displacement between two adjacent integrated underground displacement measurement sensing units, establishing a relationship model between horizontal and vertical displacements, and the type I mutual inductance voltage, the type II mutual inductance voltage respectively under different tilt angles, inputting the type I mutual inductance voltage and the type II mutual inductance voltage into the relationship model, obtaining two different mutual inductance voltage contours, wherein coordinates of the intersection point between two mutual inductance voltage contours are the relative displacement between two adjacent integrated underground displacement measurement sensing units, accurately calculating the coordinates of the intersection point, and completing a relative displacement measurement between two integrated underground displacement measurement sensing units in the measurement unit;

controlling each measurement unit formed by two adjacent integrated underground displacement measurement sensing units one by one from bottom to top to measure in sequence; comprehensively accumulating the relative displacement and direction measurement results of measurement N−1 units, unifying underground three-dimensional coordinates, and obtaining geotechnical deformation conditions and specific coordinate values from a ground surface to the deep underground.

9. The underground displacement three-dimensional measurement method based on the double mutual inductance equivalent voltage according to claim 7, wherein the measurement units are turned on one by one sequentially from bottom to top for measurement, and when one measurement unit is measuring, the other measurement units are not working.

* * * * *